United States Patent
Li

(10) Patent No.: US 12,461,571 B2
(45) Date of Patent: Nov. 4, 2025

(54) ELECTRONIC DEVICE

(71) Applicant: VIVO MOBILE COMMUNICATION CO., LTD., Guangdong (CN)

(72) Inventor: Nengzhi Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 165 days.

(21) Appl. No.: 18/313,346

(22) Filed: May 7, 2023

(65) Prior Publication Data
US 2023/0273651 A1    Aug. 31, 2023

Related U.S. Application Data

(63) Continuation of application No. PCT/CN2021/128388, filed on Nov. 3, 2021.

(30) Foreign Application Priority Data

Nov. 9, 2020 (CN) .......................... 202011238134.9

(51) Int. Cl.
*G06F 1/16* (2006.01)
*G06F 21/32* (2013.01)
(Continued)

(52) U.S. Cl.
CPC ............ *G06F 1/1684* (2013.01); *G06F 21/32* (2013.01); *H01H 13/14* (2013.01); *H04M 1/026* (2013.01)

(58) Field of Classification Search
CPC ........ H01H 13/14; H01H 13/85; H01H 13/78; H01H 3/12; G06F 1/16; G06F 21/32; H04M 1/02
(Continued)

(56) References Cited

U.S. PATENT DOCUMENTS 10,922,513 B2 *  2/2021  Chi ....................... G06F 3/0412
2010/0258421 A1 * 10/2010  Chen .................... H01H 13/705
                                                                 200/341
(Continued)

FOREIGN PATENT DOCUMENTS

CN        206789459 U      12/2017
CN        108124031 A       6/2018
(Continued)

OTHER PUBLICATIONS

First Office Action regarding Chinese Patent Application No. 202011238134.9, dated Nov. 3, 2022. Translation provided by Bohui Intellectual Property.
(Continued)

Primary Examiner — Lheiren Mae A Caroc
(74) Attorney, Agent, or Firm — Harness, Dickey & Pierce, P.L.C.

(57) ABSTRACT

An electronic device includes a first housing, a second housing, and a first button. The first button includes a functional module component, a functional module FPC, a button piece, a button pad, and a button FPC. In an accommodating space, the button FPC, the button pad, the button piece, and the functional module component are sequentially arranged from inside to outside. The functional module component is electrically connected to the functional module FPC. The functional module component and the button pad are fixed on the button piece. An assembly portion is disposed on the button pad, and the button pad is assembled with the second housing through the assembly portion.

16 Claims, 9 Drawing Sheets

(51) Int. Cl.
*H01H 13/14* (2006.01)
*H04M 1/02* (2006.01)

(58) Field of Classification Search
USPC .................................................. 200/341, 520
See application file for complete search history.

(56) References Cited

U.S. PATENT DOCUMENTS

2013/0107432 A1   5/2013   Duan et al.
2014/0285955 A1   9/2014   Matsumoto

FOREIGN PATENT DOCUMENTS

| CN | 110188740 A | 8/2019 |
| CN | 110807446 A | 2/2020 |
| CN | 210694032 U | 6/2020 |
| CN | 111478996 A | 7/2020 |
| CN | 111638762 A | 9/2020 |
| CN | 112216545 A | 1/2021 |
| CN | 214477088 U | 10/2021 |
| EP | 2911169 A2 | 8/2015 |

OTHER PUBLICATIONS

International Search Report and Written Opinion of the International Searching Authority regarding International Patent Application No. PCT/CN2021/128388, mailed Dec. 28, 2021. Translation provided by Bohui Intellectual Property.
First Office Action regarding Japanese Patent Application No. 2023-527739, dated Apr. 26, 2024.
Extended European Search Report for European Patent Application No. 21888586.1, dated Mar. 6, 2024.
Second Office Action regarding Chinese Patent Application No. 202011238134.9, dated Jun. 9, 2023.
Rejection Decision regarding Chinese Patent Application No. 202011238134.9, dated Dec. 1, 2023. Translation provided by Bohui Intellectual Property.

* cited by examiner

US 12,461,571 B2

ELECTRONIC DEVICE

CROSS-REFERENCE TO RELATED APPLICATIONS

This application is a Bypass Continuation Application of PCT/CN2021/128388 filed on Nov. 3, 2021, which claims priority to Chinese Patent Application No. 202011238134.9 filed on Nov. 9, 2020, which are incorporated herein by reference in their entirety.

TECHNICAL FIELD

Embodiments of this application relate to the field of communication technologies, and in particular, to an electronic device.

BACKGROUND

An assembly manner of a lateral fingerprint module in the prior art is to assemble a fingerprint module on a lower housing of an electronic device, and use a plastic or stainless steel support to fix the fingerprint module. In this assembly manner, the entire fingerprint module occupies a large space of the electronic device, and more glue is reduced for an upper housing of the electronic device to avoid empty space, which greatly affects the strength of the entire device.

SUMMARY

The embodiments of this application provide an electronic device, including a first housing, a second housing, and a first button, where
 the first housing and the second housing form an accommodating space for accommodating the first button, and
 the first button includes a functional module component, a functional module FPC, a button piece, a button pad, and a button FPC;
 in the accommodating space, the button FPC, the button pad, the button piece, and the functional module component are sequentially arranged from inside to outside;
 the functional module component is electrically connected to the functional module FPC;
 the functional module component and the button pad are fixed on the button piece; and
 an assembly portion is disposed on the button pad, and the button pad is assembled with the second housing through the assembly portion.

DETAILED DESCRIPTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. Objects distinguished by "first", "second", and the like are usually one type, and the number of objects is not limited. For example, the first object may be one or more than one. In addition, in the specification and the claims, "and/or" represents at least one of the connected objects, and the character "/" generally represents an "or" relationship between the associated objects.

Figure 1A:
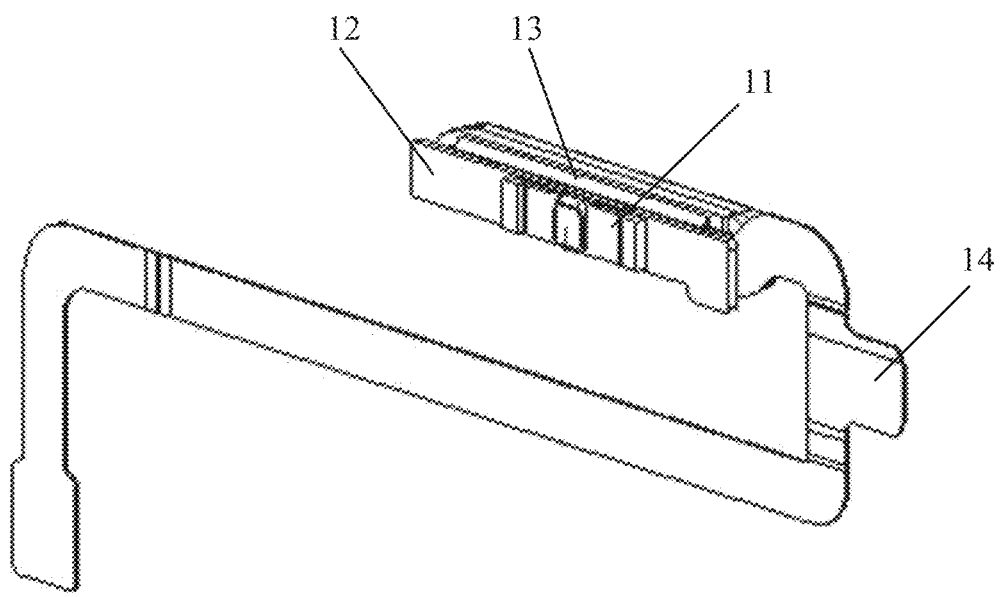
FIG. 1A is a schematic structural diagram of a fingerprint module in an existing electronic device.

To better understand the solution provided in the embodiments of this application, the following content is described first:

FIG. 1A shows a conventional fingerprint module structure, including a button soft rubber pad 11, a button steel piece 12, a fingerprint module component 13, and a fingerprint module FPC (Flexible Printed Circuit, FPC for short) 14. In an existing electronic device, a fingerprint module is usually integrated with a power button, which is convenient for a user to perform fingerprint verification while pressing the power button, thereby implementing one-step operation to complete identity verification and turn the device screen on. In an existing assembly manner, the button soft rubber pad 11 is bonded on the button steel piece 12 through dispensing, and when the user presses the power button, the button soft rubber pad 11 presses a power button FPC and implements a power button function.

Figure 1B:
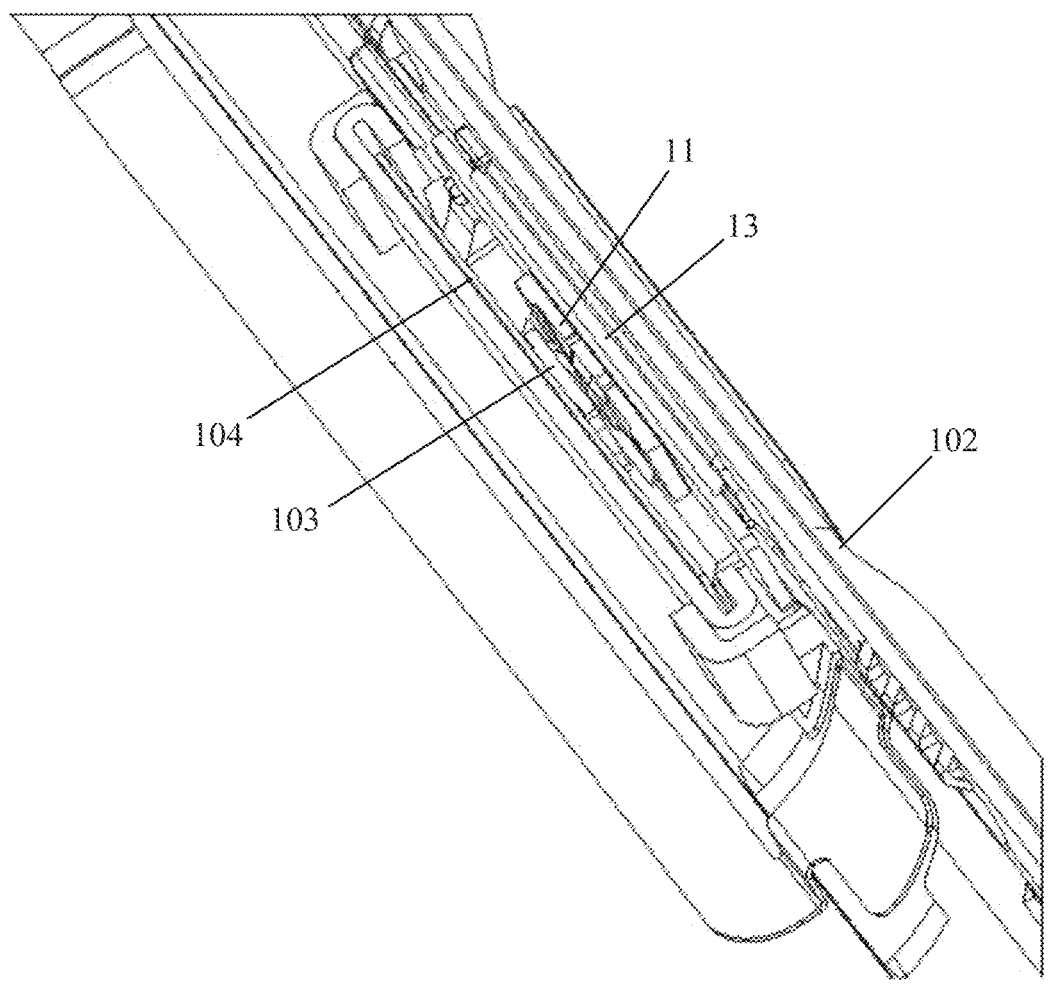
FIG. 1B is a schematic structural diagram 1 of an existing electronic device.

For example, referring to FIG. 1B, the fingerprint module component 13 is assembled on a main lower housing 102 (which may also be a lower housing, a back housing, or the like, which is not specifically limited in this application) of the electronic device. The power button FPC 103 is first integrated with a side button support steel piece 104 and then assembled on the main lower housing 102, and the fingerprint module is fixed to implement the power button function.

Figure 1C:
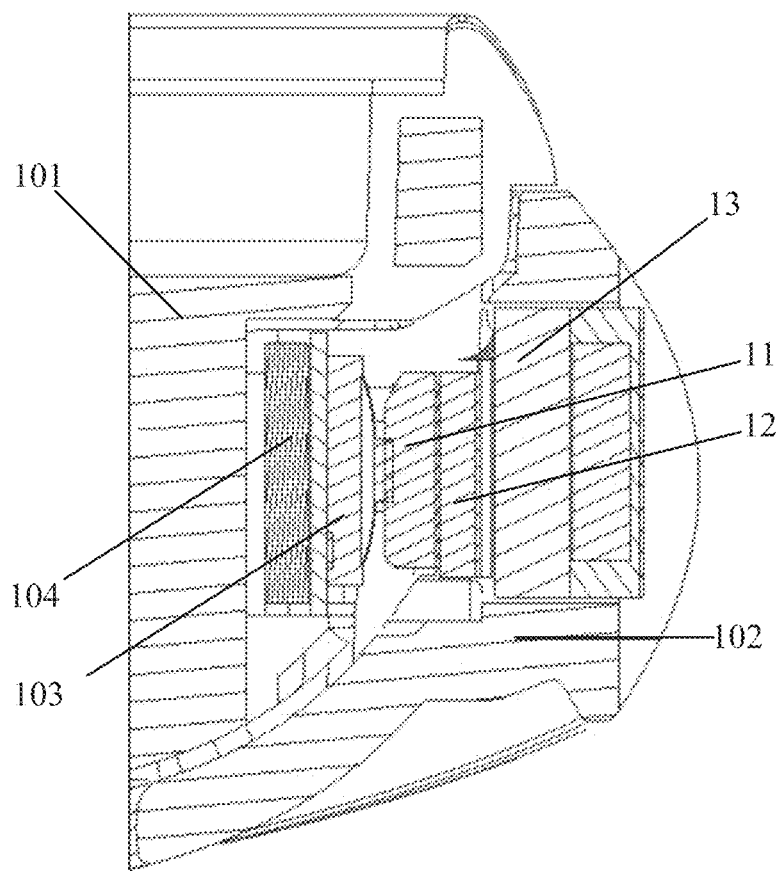
FIG. 1C is a schematic structural diagram 2 of an existing electronic device.

FIG. 1C shows an assembled state of the fingerprint module in the entire device, and there are disadvantages as follows.

(1) The fingerprint module component 13 is fixed by the side button support steel piece 104, and a cost of the side button support steel piece 104 increases a cost of the entire device.

(2) Because the side button support steel piece 104 is required to assemble the power button FPC 103 and fix the fingerprint module component 13, a steel piece needs a larger thickness, usually more than 0.3 mm, and correspondingly, more glue is reduced for the main lower housing 101 of the electronic device, which greatly affects the strength of the main upper housing 101 and the entire device.

(3) The button soft rubber pad 11 is small in area, and is bonded to the button steel piece 12 through dispensing, so that the bonding strength is insufficient and it is prone to loosening.

(4) The button soft rubber pad 11 is bonded by glue, the consistency of glue thickness is not easy to control, and a thickness size of the entire fingerprint module cannot meet a standard requirement of 0.05 thickness tolerance, which greatly affects hand feeling of the button. If a double-sided adhesive tape is used for bonding, a thicker double-sided adhesive tape is required to achieve the viscosity of the existing glue, and the thicker double-sided adhesive tape increases a component size and occupies more internal space of the device.

An electronic device provided in the embodiments of this application is described below through some embodiments and application scenarios thereof with reference to the accompanying drawings.

It should be noted that, the electronic device in the embodiments of this application may be a mobile phone, a tablet computer, a notebook computer, an intelligent furniture, an ultra-mobile personal computer (Ultra-Mobile Personal Computer, UMPC), a netbook, a personal digital assistant (Personal Digital Assistant, PDA), or the like. The type of the electronic device is not specifically limited in the embodiments of this application.

Referring to FIG. 2 to FIG. 5, the embodiments of this application provide an electronic device, including a first housing 201, a second housing 202, and a first button 203. The first button 203 may be a functional button such as a power button or a volume control button, which is not specifically limited in the embodiments of this application.

Figure 5:
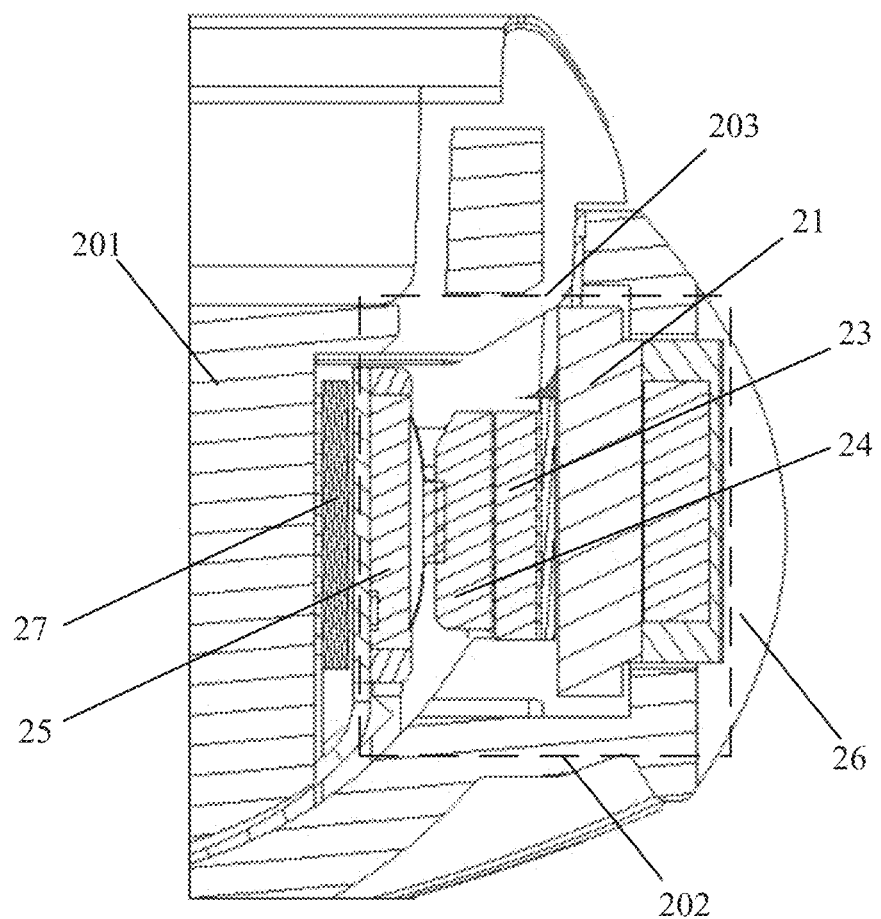
FIG. 5 is a schematic structural diagram 2 of an electronic device according to an embodiment of this application.

As shown in FIG. 5, the first housing 201 and the second housing 202 form an accommodating space for accommodating the first button 203.

The first housing 201 may also be referred to as an upper housing, a main upper housing, a front housing, or the like. The second housing 202 may also be referred to as a lower housing, a main lower housing, a back housing, or the like. The names of the first housing 201 and the second housing 202 are not specifically limited in the embodiments of this application.

The first button 203 includes a functional module component 21, a functional module FPC 22, a button piece 23, a button pad 24, and a button FPC 25. Optionally, the functional module component 21 is a fingerprint module component, and the functional module FPC 22 is a fingerprint module FPC.

It may be understood that, as shown in FIG. 5, the electronic device further includes a middle frame 26. It should be noted that, the middle frame 26 is higher than an entire functional module as a whole. However, a position corresponding to the functional module may be set to be slightly lower than the functional module (for example, a concave structure is made). In this way, on one hand, the functional module may be exposed, which is convenient for the functional module to function. For example, if the functional module is a fingerprint module, a concave structure is provided at a position corresponding to the fingerprint module in the middle frame 26, which is convenient for fingerprint recognition. On the other hand, the concave design is also convenient for the user to directly find the position of the functional module when using the electronic device, which is convenient for operation.

It should be noted that, in the embodiments of this application, there may be a plurality of types of functional modules. For example, a fingerprint module for fingerprint recognition, a vibration module for a key button feedback, a pressure detection module for button force detection of the user, or the like. The type of the functional module is not specifically limited in the embodiments of this application. The functional module component 21 may be a chip corresponding to a function, for example, a fingerprint chip, or may be a sensor corresponding to a function, for example, a pressure sensor. The specific type of the functional module component 21 is not limited in the embodiments of this application. The functional module FPC 22 is configured to transmit a signal or information received by the functional module component 21.

As shown in FIG. 5, in the accommodating space, the button FPC 25, the button pad 24, the button piece 23, and the functional module component 21 are sequentially arranged from inside to outside.

Figure 2:
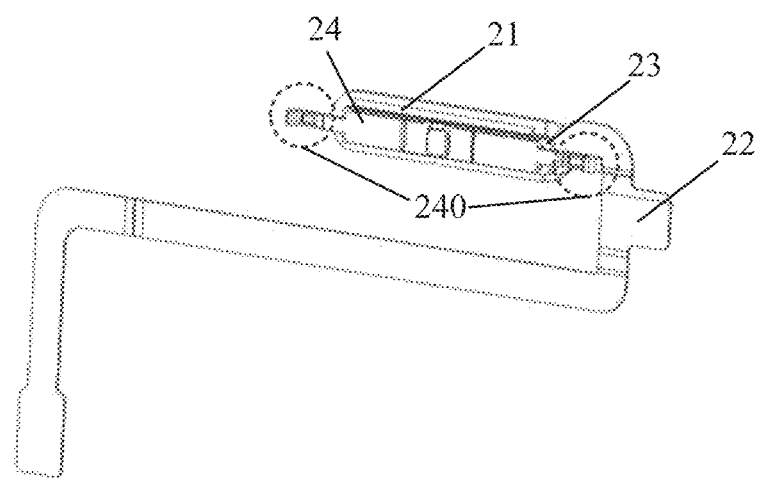
FIG. 2 is a schematic structural diagram 1 of a functional module in an electronic device according to an embodiment of this application.
Figure 3:
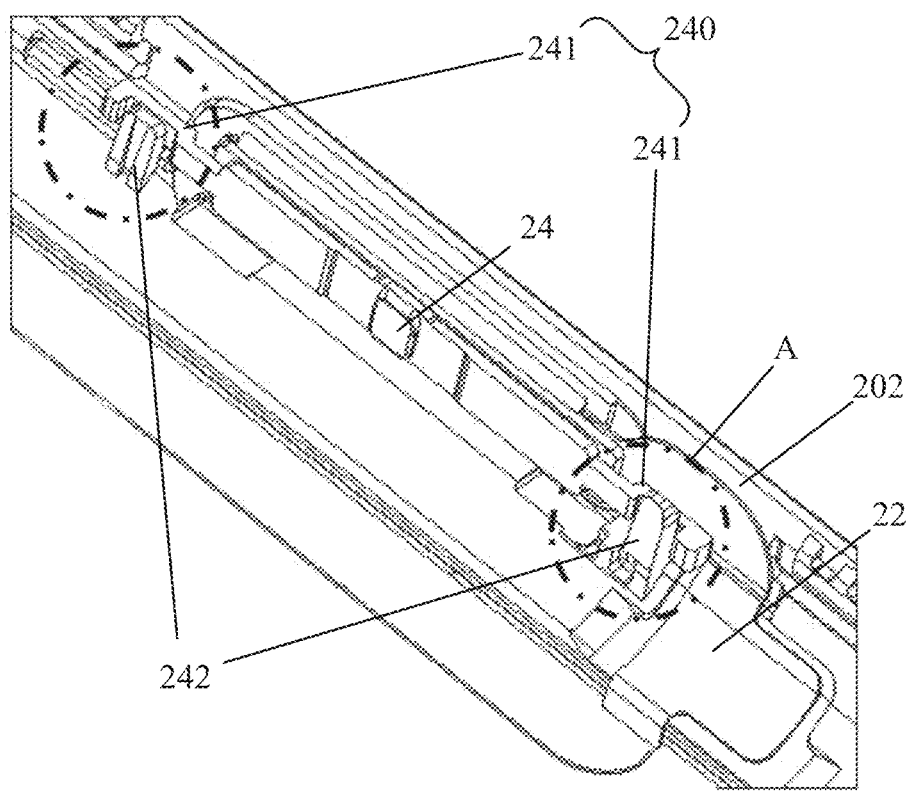
FIG. 3 is a schematic structural diagram 1 of an electronic device according to an embodiment of this application.

As shown in FIG. 2 and FIG. 3, the functional module component 21 is electrically connected to the functional module FPC 22, and the functional module FPC 22 may be electrically connected to a processor in the electronic device, and is configured to transmit a signal received by the functional module component 21 or a control signal sent by the processor.

As shown in FIG. 2, the functional module component 21 and the button pad 24 are fixed on two opposite side surfaces of the button piece 23, where the button pad 24 may be fixed to the button piece 23 through gluing.

The button pad 24 may also be referred to as a button soft rubber pad, and the button piece 23 may also be referred to as a button steel piece. As shown in FIG. 5, the button FPC 25 is located on a side of the button pad 24 away from the button piece 23. In this way, when the user presses the first button 203, the button FPC 25 is pressed by the button pad 24 to implement a button function. For example, when the first button 203 is a power button, the button FPC 25 is pressed by the button pad 24 to control the device screen on or off. For example, the button pad 24 may be a switch element or a contact on the button FPC 25, which is not specifically limited in the embodiments of this application.

The button piece 23 is mainly configured to carry the functional module component 21 and the button pad 24, and a metal material such as hard plastic or steel may be used to ensure the structural strength. The button pad 24 may be made of a material with a certain elastic buffering effect such as rubber, or silica gel, which can protect the button FPC 25, and provide a certain pressing feedback for the user to improve user experience. The materials of the button pad 24 and the button piece 23 are not specifically limited in the embodiments of this application.

Referring to FIG. 2, an assembly portion 240 is disposed on the button pad 24, and referring to FIG. 3, the button pad 24 is assembled with the second housing 202 through the assembly portion 240.

In the embodiments of this application, the assembly portion 240 is disposed on the button pad 24, and the button pad 24 is assembled with the second housing 202 through the assembly portion 240. In this way, the fixed assembly of the entire functional module (including the functional module component 21, the functional module FPC 22, the button piece 23, and the button pad 24) inside the device is implemented by the assembly portion 240 on the button pad 24. Compared with the existing electronic device shown in FIG. 1A to FIG. 1C, an original side button support steel piece 104 is omitted to reduce costs, and the assembly is performed directly through the assembly portion 240, so that the assembly manner is simpler. After the side button support steel piece 104 is omitted, an internal space of the device required for assembling the functional module is reduced, and the saved space can be used to thicken a side edge of the first housing 201, to improve the strength and reliability of the first housing 201 and the entire device.

In addition, because the assembly portion 240 needs to be arranged on the button pad 24, in actual implementation, an area of the button pad 24 needs to be increased, so that an adhesive area between the button pad 24 and the button piece 23 is larger, which is beneficial to improving the adhesive strength between the button pad 24 and the button piece 23.

Still referring to FIG. 3, in some implementations, the assembly portion 240 includes two first assembly members 241 disposed at two ends of the button pad 24, respectively, and two second assembly members 242 are disposed on the second housing 202.

In an actual application scenario, the button pad 24 is usually in a shape of an elongated rectangle or an ellipse, so that the two first assembly members 241 may be disposed at two ends of the button pad 24 in a length direction, respectively; and each first assembly member 241 fits with one of the second assembly members 242.

In the embodiments of this application, to fit with the first assembly member 241 on the button pad 24, the second assembly member 242 is disposed on the second housing 202, and the assembly members fit with each other in pairs.

Figure 4:
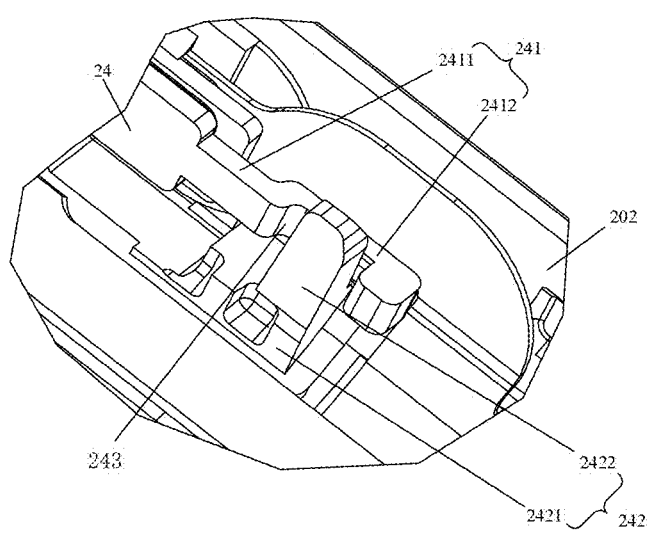
FIG. 4 is a schematic enlarged diagram of region A in FIG. 3.

Referring to FIG. 4, in some implementations, the first assembly member 241 has a first connecting end 2411 and a first assembly end 2412, and the second assembly member 242 has a second connecting end 2421 and a second assembly end 2422; the first assembly member 241 is fixedly connected to the button pad 24 through the first connecting end 2411, and the second assembly member 242 is fixedly connected to the second housing 202 through the second connecting end 2421; and the first assembly end 2412 of the first assembly member 241 is detachably coupled to the second assembly end 2422 of the second assembly member 242.

Still referring to FIG. 4, in some implementations, the first assembly end 2412 of the first assembly member 241 bends in a first direction to form a concave portion 243; and the second assembly end 2422 of the second assembly member 242 extends in a second direction and abuts against the concave portion 243, that is, the concave portion 243 formed by bending of the first assembly end 2412 can play a movement limiting role for the second assembly end 2422. In this way, when the button FPC 25 is pressed by the button pad 24, the button FPC 25 can be prevented from being overly pressed and the device can be prevented from being damaged.

Alternatively, the second assembly end 2422 of the second assembly member 242 extends in the second direction and clamps to the concave portion 243, that is, the concave portion 243 formed by bending of the first assembly end 2412 can play a locking role for the second assembly end 2422 to improve assembly stability.

The first direction is perpendicular to the second direction, that is, the first assembly end 2412 and the second assembly end 2422 are cross-assembled opposite each other to enhance the assembly stability.

The first direction is a direction in which the button FPC 25 is pressed, that is, the first assembly end 2412 is bent in a direction of the button FPC 25 to form the concave portion 243. The reason is that a function of the first button is implemented by pressing the button FPC 25 through the button pad 24. During use of the first button, the button pad 24 moves slightly toward the button FPC 25. In this case, the first assembly end 2412 and the second assembly end 2422 bent toward the button FPC 25 fit with each other to ensure that the entire functional module is firmly assembled and prevent the functional module from being misplaced or damaged due to the use of the first button.

In some implementations, the first assembly end 2412 of the first assembly member 241 may be an annular structure, that is, the first assembly end 2412 may be a ring, and the second assembly end 2422 of the second assembly member 242 may be a columnar structure, that is, the first assembly end 2412 may be a column. The first assembly end 2412 of the first assembly member 241 is sleeved on the second assembly end 2422 of the second assembly member 242.

In the embodiments of this application, a fitting manner of the ring and the column is used. On one hand, the assembly difficulty can be reduced to improve the assembly efficiency of the device. On the other hand, the fitting stability of the first assembly end 2412 and the second assembly end 2422 can be ensured to prevent the functional module from being misplaced or damaged.

Figure 6:
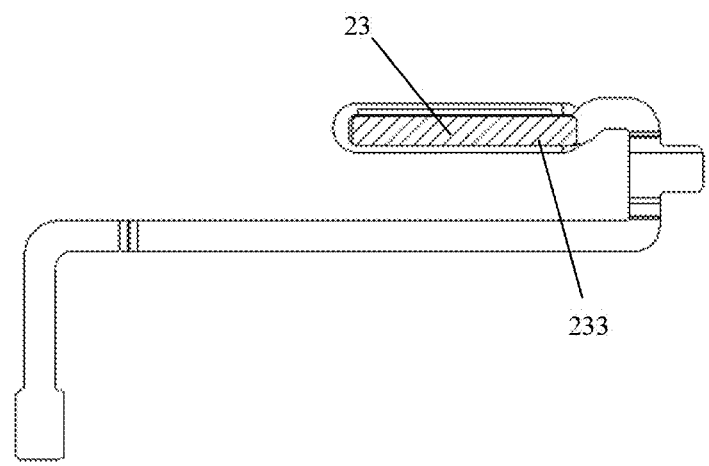
FIG. 6 is a schematic structural diagram 2 of a functional module in an electronic device according to an embodiment of this application.

Referring to FIG. 6, in some implementations, a laser engraving structure 233 is disposed on a side surface of the button piece 23 close to the button pad 24, and it may be understood that the button pad 24 is omitted in FIG. 6 for clarity of display.

In the embodiments of this application, an entire surface of the button piece 23 is laser engraved, to increase a dyne value of the surface of the button piece 23 (that is, a surface tension coefficient, which is commonly referred to as the dyne value), thereby increasing the bonding strength after the button piece 23 is bonded to the button pad 24.

It should be noted that, oblique section lines in FIG. 6 are only used to identify the laser engraving on the button piece 23, and do not represent that an actual laser engraved shape is a shape shown in FIG. 6. The laser engraved shape on the surface of the button piece 23 is not specifically limited in the embodiments of this application.

Figure 7:
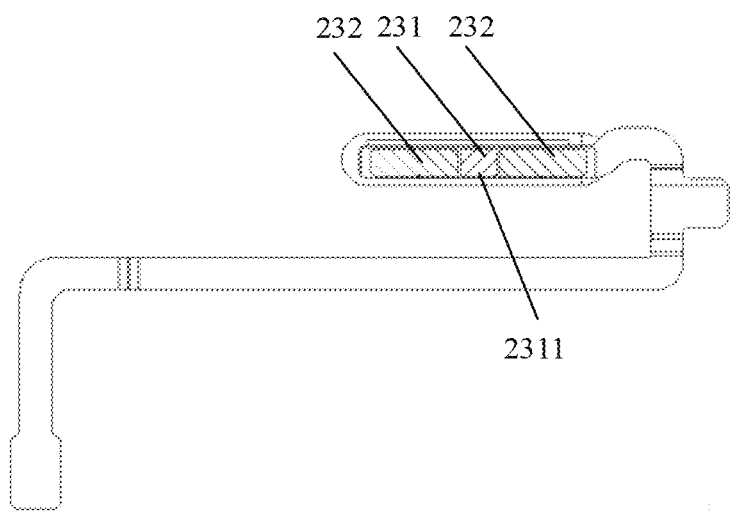
FIG. 7 is a schematic structural diagram 3 of a functional module in an electronic device according to an embodiment of this application.

Referring to FIG. 7, in some implementations, the button pad 24 is bonded on the button piece 23, where a first bonding region 231 and two second boning regions 232 are provided between the button pad 24 and the button piece 23, the two second boning regions 232 are located on two sides of the first bonding region 231, and the button pad 24 is bonded in the first bonding region 231 and the second bonding region 232 in different manners.

In the embodiments of this application, considering that the button FPC 25 is pressed by the middle of the button pad 24, a middle bonding thickness size of the button pad 24 needs to be more precise. Therefore, two types of bonding regions are obtained through division between the button pad 24 and the button piece 23, a middle part is the first bonding region 231, and two end parts are the second bonding regions 232, that is, the regions obtained through division by the oblique section lines in FIG. 7. The first bonding region 231 is used to ensure the precise bonding thickness size, and the second bonding regions 232 are used to ensure the bonding strength.

For example, the button pad 24 is bonded to the button piece 23 in the first bonding region 231 through a double-sided adhesive tape 2311, and the button pad 24 is bonded to the button piece 24 in the second bonding regions 232 in a dispensing manner.

In the embodiments of this application, the first bonding region 231 in the middle part adopts a manner of sticking a double-sided adhesive tape 2311, which can ensure that the thickness size of the entire functional module is more precise after the button pad 24 is bonded, and the second bonding regions 232 in the two end parts adopt a dispensing manner, which can improve the bonding strength of the button pad 24, so that the bonding is more reliable.

Still referring to FIG. 5, the electronic device further includes a reinforcement piece 27. The reinforcement piece 27 is disposed on a side of the button FPC 25 away from the button pad 24, and the reinforcement piece 27 is fixed on the first housing 201.

In the embodiments of this application, the reinforcement piece 27 may also be referred to as an FPC reinforcement piece, and the button FPC 25 is fixed on the first housing 201 through the reinforcement piece 27.

It should be noted that, the reinforcement piece 27 in the embodiments of this application is not equivalent to the side button support steel piece 104 in FIG. 1C. The reinforcement piece 27 in the embodiments of this application is only used to fix the button FPC 25 and complement the structural strength, while the side button support steel piece 104 in FIG. 1C is also used to fix the entire functional module. Since a strength requirement on the reinforcement piece 27 is lower than that on the side button support steel piece 104, in an actual application scenario, a thickness of the reinforcement piece 27 may be at least 0.15 mm thinner than that of the side button support steel piece 104.

For example, the reinforcement piece 27 is bonded to the first housing 201 through a double-sided adhesive tape.

In some embodiments, a thickness of the double-sided adhesive tape between the reinforcement piece 27 and the first housing 201 ranges from 0.04 mm to 0.06 mm, for example, 0.05 mm.

In the embodiments of this application, the reinforcement piece 27 is fixed by using the double-sided adhesive tape, which is convenient for controlling the bonding thickness size. In the existing electronic device shown in FIG. 1A to FIG. 1C, a gap of 0.2 mm is required between the side button support steel piece 104 and the main upper housing 101 (that is, the bonding thickness in the existing solution). By comparison, in the solution in the embodiments of this application, the thickness of the double-sided adhesive tape between the reinforcement piece 27 and the first housing 201 can be only 0.05 mm. In this way, a space of 0.15 mm is saved for the first housing 201, so that a side wall of the first housing 201 may be thickened by more than 0.3 mm.

In some implementations, the electronic device in the embodiments of this application further includes a second button, and a button FPC is electrically connected to the second button.

In the embodiments of this application, the button FPC is applied to both the first button and the second button, that is, FPCs of the first button and the second button are made into one, which can reduce the cost of the FPCs. For example, the first button may be a power button, and the second button may be a volume button.

It should be noted that the terms "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that, the scope of the method and apparatus in the embodiments of this application is not limited to performing functions in the order shown or discussed, and it may further include performing the functions in a substantially simultaneous manner or in reverse order according to the functions involved. For example, the described method may be performed in a different order than described, and various steps may also be added, omitted, or combined. In addition, features described with reference to some examples may be combined in other examples.

The embodiments of this application are described above with reference to the accompanying drawings, but this application is not limited to the foregoing specific embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. An electronic device, comprising a first housing, a second housing, and a first button, wherein
the first housing and the second housing form an accommodating space for accommodating the first button, and
the first button comprises a functional module component, a functional module FPC, a button piece, a button pad, and a button FPC;
in the accommodating space, the button FPC, the button pad, the button piece, and the functional module component are sequentially arranged from inside to outside;
the functional module component is electrically connected to the functional module FPC;
the functional module component and the button pad are fixed on the button piece; and
an assembly portion is disposed on the button pad, and the button pad is assembled with the second housing through the assembly portion; wherein
the assembly portion comprises two first assembly members disposed at two ends of the button pad, respectively, and two second assembly members are disposed on the second housing;
each first assembly member fits with one of the second assembly members;
each first assembly member has a first connecting end and a first assembly end, and each second assembly member has a second connecting end and a second assembly end;
each first assembly member is fixedly connected to the button pad through the first connecting end, and each second assembly member is fixedly connected to the second housing through the second connecting end;
the first assembly end of each first assembly member is detachably connected to the second assembly end of each second assembly member;
the first assembly end of each first assembly member bends in a first direction to form a concave portion;
the second assembly end of each second assembly member extends in a second direction, and abuts against or clamps to the concave portion; and
the first direction is perpendicular to the second direction.

2. The electronic device according to claim 1, wherein the first direction is a direction toward the button FPC.

3. The electronic device according to claim 1, wherein a laser engraving structure is disposed on a side surface of the button piece close to the button pad.

4. The electronic device according to claim 3, wherein the button pad is bonded on the button piece;

a first bonding region and two second bonding regions are provided between the button pad and the button piece, the two second bonding regions are located on two sides of the first bonding region, and the button pad is bonded in the first bonding region and the second bonding regions in different manners.

5. The electronic device according to claim 4, wherein the button pad is bonded to the button piece in the first bonding region through a double-sided adhesive tape, and the button pad is bonded to the button piece in the second bonding regions in a dispensing manner.

6. The electronic device according to claim 1, further comprising a reinforcement piece, wherein
the reinforcement piece is disposed on a side of the button FPC away from the button pad, and the reinforcement piece is fixed on the first housing.

7. An electronic device, comprising a first housing, a second housing, and a first button, wherein
the first housing and the second housing form an accommodating space for accommodating the first button;
the first button comprises a functional module component, a functional module FPC, a button piece, a button pad, and a button FPC;
in the accommodating space, the button FPC, the button pad, the button piece, and the functional module component are sequentially arranged from inside to outside;
the functional module component is electrically connected to the functional module FPC;
the functional module component and the button pad are fixed on the button piece;
an assembly portion is disposed on the button pad, and the button pad is assembled with the second housing through the assembly portion;
the assembly portion comprises two first assembly members disposed at two ends of the button pad, respectively, and two second assembly members are disposed on the second housing;
each first assembly member fits with one of the second assembly members;
each first assembly member has a first connecting end and a first assembly end, and each second assembly member has a second connecting end and a second assembly end;
each first assembly member is fixedly connected to the button pad through the first connecting end, and each second assembly member is fixedly connected to the second housing through the second connecting end;
the first assembly end of each first assembly member is detachably connected to the second assembly end of each second assembly member;
the first assembly end of each first assembly member is an annular structure, and the second assembly end of each second assembly member is a columnar structure; and
the first assembly end of each first assembly member is sleeved on the second assembly end of each second assembly member.

8. The electronic device according to claim 7, wherein a laser engraving structure is disposed on a side surface of the button piece close to the button pad.

9. The electronic device according to claim 8, wherein the button pad is bonded on the button piece;
a first bonding region and two second bonding regions are provided between the button pad and the button piece, the two second bonding regions are located on two sides of the first bonding region, and the button pad is bonded in the first bonding region and the second bonding regions in different manners.

10. The electronic device according to claim 9, wherein the button pad is bonded to the button piece in the first bonding region through a double-sided adhesive tape, and the button pad is bonded to the button piece in the second bonding regions in a dispensing manner.

11. The electronic device according to claim 7, further comprising a reinforcement piece, wherein
the reinforcement piece is disposed on a side of the button FPC away from the button pad, and the reinforcement piece is fixed on the first housing.

12. An electronic device, comprising a first housing, a second housing, and a first button, wherein
the first housing and the second housing form an accommodating space for accommodating the first button;
the first button comprises a functional module component, a functional module FPC, a button piece, a button pad, and a button FPC;
in the accommodating space, the button FPC, the button pad, the button piece, and the functional module component are sequentially arranged from inside to outside;
the functional module component is electrically connected to the functional module FPC;
the functional module component and the button pad are fixed on the button piece;
an assembly portion is disposed on the button pad, and the button pad is assembled with the second housing through the assembly portion;
a laser engraving structure is disposed on a side surface of the button piece close to the button pad;
the button pad is bonded on the button piece;
a first bonding region and two second bonding regions are provided between the button pad and the button piece, the two second bonding regions are located on two sides of the first bonding region, and the button pad is bonded in the first bonding region and the second bonding regions in different manners; and
the button pad is bonded to the button piece in the first bonding region through a double-sided adhesive tape, and the button pad is bonded to the button piece in the second bonding regions in a dispensing manner.

13. The electronic device according to claim 12, wherein the assembly portion comprises two first assembly members disposed at two ends of the button pad, respectively, and two second assembly members are disposed on the second housing; and
each first assembly member fits with one of the second assembly members.

14. The electronic device according to claim 13, wherein
each first assembly member has a first connecting end and a first assembly end, and each second assembly member has a second connecting end and a second assembly end;
each first assembly member is fixedly connected to the button pad through the first connecting end, and each second assembly member is fixedly connected to the second housing through the second connecting end; and
the first assembly end of each first assembly member is detachably connected to the second assembly end of each second assembly member.

15. The electronic device according to claim 14, wherein
the first assembly end of each first assembly member bends in a first direction to form a concave portion;
the second assembly end of each second assembly member extends in a second direction, and abuts against or clamps to the concave portion; and
the first direction is perpendicular to the second direction.

16. The electronic device according to claim 15, wherein the first direction is a direction toward the button FPC.

\* \* \* \* \*